United States Patent [19]

Shinbori

[11] 4,418,896

[45] Dec. 6, 1983

[54] APPARATUS FOR CONTROLLING THE FRICTION BETWEEN THE LEAF SPRINGS OF A LAMINATED LEAF SPRING ASSEMBLY

[75] Inventor: Takeyoshi Shinbori, Yokosuka, Japan

[73] Assignee: NHK Spring Co., Ltd., Yokohama, Japan

[21] Appl. No.: 403,868

[22] Filed: Jul. 30, 1982

[30] Foreign Application Priority Data

Aug. 10, 1981 [JP] Japan ............... 56-125125

[51] Int. Cl.³ .................. B60G 11/02; F16F 1/18
[52] U.S. Cl. .................. 267/36 R; 267/49; 267/54 R; 267/53; 280/718
[58] Field of Search .......... 267/36 A, 37 R, 53, 267/37 A, 49, 47, 50, 31, 54 R, 32, 54 A, 48, 54 B, 56, 52, 44, 55, 54 C, 51, 54 D, 54 E, 36 R, 23, 24, 30, 19, 9 R, 9 B, 9 A; 280/707, 718, 719, 720; 188/2 A

[56] References Cited

U.S. PATENT DOCUMENTS

| | | | |
|---|---|---|---|
| 1,235,703 | 8/1917 | Larson | 267/36 R |
| 1,436,012 | 11/1922 | Cesak | 267/50 |
| 1,647,518 | 11/1927 | Hawley, Jr. | 267/31 X |
| 2,873,962 | 2/1959 | Lampman et al. | 267/49 |
| 3,231,258 | 1/1966 | Brownyer et al. | 267/47 X |
| 3,294,390 | 12/1966 | Warmkessel | 267/31 |
| 3,484,091 | 12/1969 | Draves | 267/54 R |
| 3,730,549 | 5/1973 | Turner, Jr. | 267/31 X |
| 4,022,449 | 5/1977 | Estorff | 267/48 |

FOREIGN PATENT DOCUMENTS

| | | | |
|---|---|---|---|
| 2421115 | 11/1975 | Fed. Rep. of Germany | 267/54 R |
| 401549 | 1/1909 | France | 267/24 |
| 55-93747 | 6/1980 | Japan . | |
| 56-80536 | 7/1981 | Japan . | |
| 56-87643 | 7/1981 | Japan . | |

*Primary Examiner*—Douglas C. Butler
*Attorney, Agent, or Firm*—Frishauf, Holtz, Goodman and Woodward

[57] ABSTRACT

An apparatus for controlling the friction between the leaf springs of a laminated leaf spring assembly comprises a clamping mechanism, a hydraulic cylinder mechanism, a hydraulic control mechanism and a detecting mechanism. The clamping mechanism includes a guide member and a press member. The guide member and the press member hold and clamp the laminated leaf spring assembly. The hydraulic cylinder mechanism has a cylinder and a piston movable in the cylinder and presses the press member to urge the laminated leaf spring assembly against the guide member. The hydraulic control mechanism has a pressure reducing value for controlling the pressure of a liquid supplied to the cylinder of the hydraulic cylinder mechanism. The detecting mechanism detects the values of the predetermined factors of a body supported by the laminated leaf spring assembly and supplies signals representative of the values to the pressure reducing valve. According to the signals from the detecting mechanism, the pressure reducing valve controls the pressure of the liquid supplied to the cylinder of the hydraulic cylinder mechanism.

3 Claims, 3 Drawing Figures

APPARATUS FOR CONTROLLING THE FRICTION BETWEEN THE LEAF SPRINGS OF A LAMINATED LEAF SPRING ASSEMBLY

BACKGROUND OF THE INVENTION

The present invention relates to an apparatus for controlling the friction between the leaf springs of a laminated leaf spring assembly in accordance with the state of a body to be supported.

A laminated leaf spring assembly comprising a number of leaf springs is widely used for suspending a body, e.g. the body of a large vehicle such as a truck or a bus. When the laminated leaf spring assembly suspends the body of a vehicle, the driver's comfort and the driving stability of the vehicle depend on the spring constant of the assembly and the friction between the leaf springs of the assembly. Of course they depend on the condition of the road as well. When the vehicle runs on a smooth road, the smaller the friction between the leaf springs, the more comfort the driver will have. However, the larger is the friction between the leaf springs, the more easy it is for the driver to drive the vehicle. The driver's comfort is considered more important than the driving stability of the vehicle as long as the vehicle runs on a smooth road. This is because a sufficient driving stability is ensured unless the steering wheel needs to be suddenly turned.

In order to increase the friction between the leaf springs, the leaf springs are clamped together by a clamping means at both end portions. The known clamping means is bolts and can clamp the leaf springs tight enough to increase the friction to such extent that the driver's comfort is ensured while the vehicle runs on a rough road. However, the bolts do not help to give the driver comfort while the vehicle runs on a smooth road.

SUMMARY OF THE INVENTION

It is therefore an object of the invention to provide an apparatus for controlling the friction between the leaf springs of a laminated leaf spring assembly, which can optimize the friction according to the state of a body to be supported by the spring assembly.

According to the invention, there is provided an apparatus for controlling the friction between the leaf springs of a laminated leaf spring assembly, which comprises clamping means mounted on the laminated leaf spring assembly attached at both ends to a body to be supported. The clamping means clamps the spring assembly and applies clamping force on the spring assembly in the thickness direction thereof. The clamping means includes a guide member and a press member which clamp the spring assembly. The pressure member is connected to one end of a piston of a hydraulic cylinder means. The pressure of a fluid into a cylinder of the hydraulic cylinder means is transmitted to the spring assembly by the piston and the press member. The pressure of the fluid from a fluid source is controlled by a pressure reducing valve of a pressure control means. The apparatus further comprises detecting means for detecting the values of the predetermined factors of the body, such as the acceleration of a vehicle, and for supplying signals to the control valve so as to control the pilot pressure of the pressure reducing valve.

That is, the pressure of the fluid is controlled in accordance with the values of the factors of the body to thereby optimize the friction between the leaf springs of the laminated leaf spring assembly. If the assembly is used to suspend a vehicle, the pressure of the fluid is set to low levels to decrease the friction when the vehicle runs on a smooth road. Conversely the pressure of the fluid is raised to increase the friction when the vehicle runs on a rough road or at turns. Therefore, the driver's comfort is maintained optimum.

The above and further object and novel features of the invention will more fully appear from the flowing detailed description when the same is read in connection with the accompanying drawings. It is to be expresslyunderstood, however, that the drawings are for purpose of illustration only and are not intended as a definition of the limits of the invention.

DETAILED DESCRIPTION OF THE PREFERRED EMBODIMENT

Figure 1:
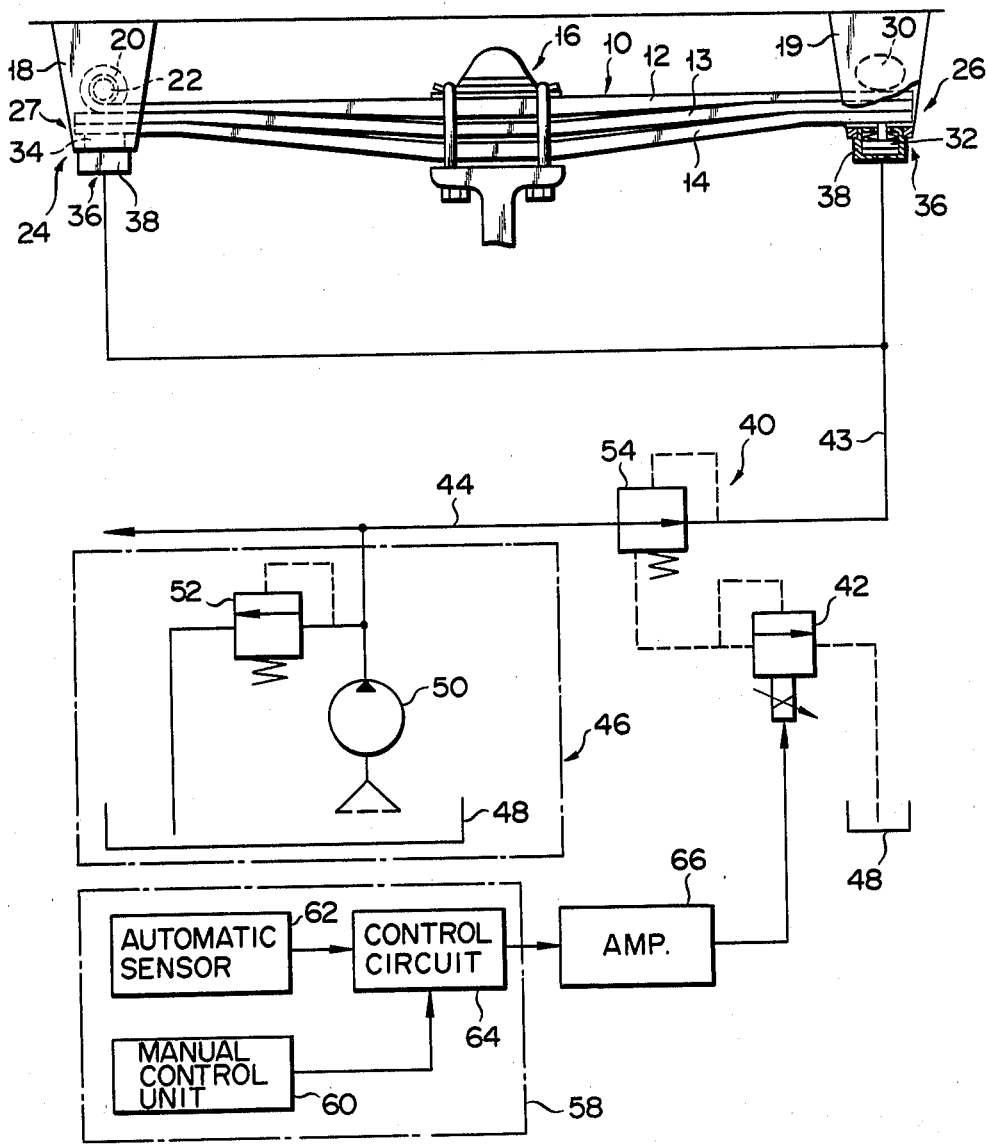
FIG. 1 is partly a front view of a laminated leaf spring assembly and partly a block diagram of an embodiment of the invention, an apparatus for controlling the friction between the leaf springs of the laminated leaf spring assembly.

Referring to FIG. 1, a laminated leaf spring assembly 10 includes three leaf springs 12, 13 and 14. The springs 12, 13 and 14 are tapered leaf springs. However, they may be replaced by partially tapered leaf springs or leaf springs of a uniform thickness. The leaf springs 12, 13 and 14 have substantially the same length. But they may be replaced by leaf springs of different lengths which are laminated in a stepped form. The springs 12, 13 and 14 are clamped at the middle portion by a U-bolt assembly 16, with the clamping force acting on them in the direction of thickness of the assembly 10 as in the prior art leaf spring assembly. If used for suspending a vehicle body, the laminated leaf spring assembly 10 is connected to a rear axle (not shown) of the vehicle body by, for example, the U-bolt 16.

The ends of the laminated leaf spring assembly 10 is coupled to the vehicle body by the brackets 18 and 19, respectively. The upper leaf spring 12 has at its left end a spring eye 20. The spring eye 20 is formed integrally with the spring 12 and is pivotally supported on the bracket 18 by a pin 22.

An apparatus 24 is provided which controls the friction between the leaf springs 12, 13 and 14. The apparatus comprises a pair of clamping means 26 and 27 which are disposed at the ends of the laminated leaf spring assembly 10, respectively. One of the clamping means may be omitted. Both clamping means serve to exert clamping force on the leaf springs 12, 13 and 14 in the direction of their thickness and to permit the springs 12, 13 and 14 to slide relative to one another.

The clamping means 26 includes a guide member 30 and a press member 32. The guide member 30 is mounted on the bracket 19. It abuts against the upper surface of the leaf spring 12 to allow the right end portion of the spring 12 to slide in the horizontal direction. The press member 32 abuts against the lower surface of the lower spring 14 to allow the spring 14 to slide in the horizontal direction. Hence the guide member 30 and the press member 32 hold and clamp the right end portions of the leaf springs 12, 13 and 14.

The clamping means 27 includes the pin 22. The pin 22 acts as a guide member but does not allow the left end portion of the upper spring 12 to slide in the horizontal direction. The press member 34 works exactly in the same way as the press member 32. The pin 22 and the press member 34 therefore hold and clamp the left end portions of the leaf springs 12, 13 and 14.

The apparatus 24 further comprises a pair of hydraulic cylinder means 36 which are mounted on the clamping means 26 and 27, respectively. Each hydraulic cylinder means 36 includes a cylinder 38 and a piston (not shown) which can move up and down in the cylinder 38. The pistons of the hydraulic cylinder means 36 are connected to the press members 32 and 34, respectively. Both hydraulic cylinder means 36 are of single-acting type and includes each a return spring which is disposed in the cylinder 38 to return the piston to the initial position. They may be replaced by double-acting hydraulic cylinder means which need no return spring.

The apparatus 24 further comprises a hydraulic control means 40. The hydraulic control means 40 includes an electromagnetic control valve 42 for controlling the pressure of oil which is supplied through a duct 43 into the cylinders 38 of both hydraulic cylinder means 36. Another duct 44 connects the control valve 42 to a fluid source 46 which is provided for the power steering assembly of the vehicle. The fluid source has a reservoir 48, a pump 50 and a relief valve 52. A pressure reducing valve 54 is connected between the control valve 42 and the cylinders 38.

The apparatus 24 comprises a detector means 58 for detecting the predetermined factors relating to the movement of the vehicle and generating signals representing these factors. According to the signals from the detector means 58 the conrol valve 42 changes the pressure of oil. The detector means 58 includes a manual control unit 60 and an automatic sensor 62. The automatic sensor 62 can detect the factors relating to the movement of the vehicle, such as the vertical acceleration, the horizontal acceleration, the speed or the displacement of the vehicle and can detect the steering angle of the steering wheel. The detector means 58 further includes a control circuit 64 for controlling signals from the manual control unit 60 and the automatic sensor 62. The output signals from the control circuit 64 are supplied to the control valve 42 through an amplifier 66.

When the vehicle runs on a rough road and moves up and down very much, the automatic sensor 62 generates and supplies signals to the control unit 64. The control unit 64 then generates control signals, which are supplied through the amplifier 66 to the control valve 42. In response to these signals the control valve 42 changes the pilot pressure of the pressure reducing valve 54. As a result, the pressure of oil supplied to the cylinders 38 of both hydraulic cylinder means 36 is raised. Thus, the right and left end portions of the leaf springs 12, 13 and 14 are strongly clamped. The friction between the leaf springs 12, 13 and 14 therefore increases, and the laminated leaf spring assembly 10 becomes rigid. Consequently, the vehicle body less moves up and down and the driver's comfort is maintained.

Conversely when the vehicle runs on a smooth road and moves up and down a little, the automatic sensor 62, the control unit 64, the control valve 42 and the pressure reducing valve 54 cooperate, thus reducing the oil pressure in the cylinders 38 of both hydraulic cylinder means 36. As a result, the right and left end portions of the leaf springs 12, 13 and 14 become loose, and the laminated leaf spring assembly 10 becomes less rigid. Thus, the driver's comfort is maintained also in this case.

Further, when the driver suddenly turns the steering wheel while the vehicle is running at a high speed, the friction between the leaf springs 12, 13 and 14 is controlled by the signals from the automatic sensor 62 which represent the angle by which the steering wheel has been turned. The friction is so controlled that the driver's comform is preserved. More specifically, the signals eventually causes both clamping means 26 and 27 to clamp the left and right end portions of the leaf springs 12, 13 and 14, thus increasing the friction between the springs 12, 13 and 14. As the friction increases, the dynamic spring constant of the laminated leaf spring assembly 10 increases, though the static spring constant of the assembly 10 stays unchanged.

Moreover, the driver may, if he wishes, change the friction between the leaf springs 12, 13 and 14 to attain the best comfort for him. This is accomplished by operating the manual control unit 60. The manual control unit 60 is therefore a device for correcting the automatic friction control, thereby clamping the leaf springs 12, 13 and 14 with a desired force.

Only a small amount of oil needs to be supplied to the cylinders 38 of both hydraulic cylinder means 36 in order to control the clamping force on the leaf springs 12, 13 and 14. The reservoir 48 therefore need not be large. Since the liquid source 56 of the power steering assembly of the vehicle serves to control the clamping force, no other liquid source specially designed for the purpose need to be used.

Figure 2:
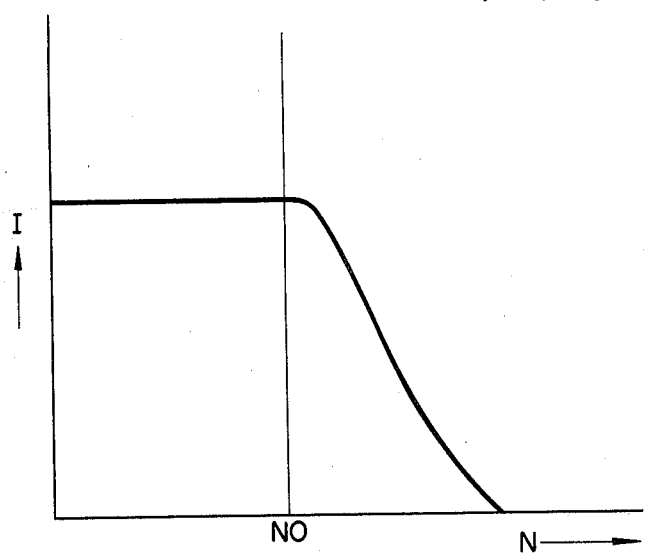
FIG. 2 is a graph illustrating an electric current as a function of a vibration transmissibility.
Figure 3:
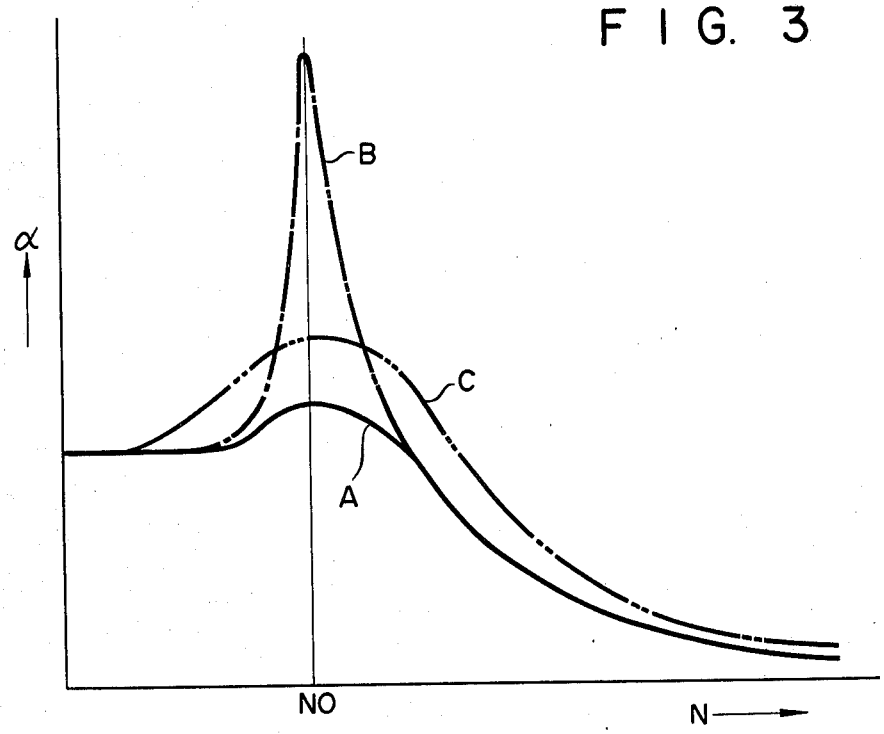
FIG. 3 is a graph illustrating a vibration frequency as a function of a vibration transmissibility.

As described above, the pressure reducing valve 54 is driven by the electromagnetic control valve 42, thereby to control the friction between the leaf springs 12, 13 and 14. The input current I to the electromagnetic control valve 42 is controlled according to the frequency N of vibration of the vehicle body as illustrated in FIG. 2. When the frequency N falls below the resonance frequency $N_0$, the input current I is increased to thereby apply more clamping force on the leaf springs 12, 13 and 14 and thereby to lower the peak vibration transmissibility $\alpha$ which is indicated by a solid line in FIG. 3. When the frequency N rises above the resonance frequency $N_0$, the input current I is decreased to thereby reduce the clamping force and then lower the peak vibration transmissibility $\alpha$. A one-dot chain line shown in FIG. 3 illustrates the relation between the frequency N and the vibration transmissibility in the case the laminated leaf spring assembly 10 is connected to no shock absorber. A two-dot chain line shown in FIG. 3 shows the relation in the case the assembly 10 is connected to a shock absorber.

The present invention is not limited to the embodiment described above. Both hydraulic cylinder means 36 may be positioned above the laminated leaf spring assembly 10. Alternatively, the hydraulic cylinder means 36 may be attached to the vehicle body and may be coupled to the pressure members 38, respectively, by proper coupling means. Other variations and modifications can be made within the scope of the invention.

What is claimed is:

1. An apparatus for controlling the friction between leaf springs of a laminated leaf spring assembly, comprising:

clamping means mounted on the laminated leaf spring assembly which is attached at both ends to a body, thus supporting the body, for clamping the laminated leaf spring assembly, said clamping means including a guide member and a press member which clamp the laminated leaf spring assembly;

hydraulic cylinder means for pressing said press member to thereby urge said laminated leaf spring assembly against said guide member, said hydraulic cylinder means including a cylinder and a piston which is movable in the cylinder and one end of which is connected to said press member;

hydraulic control means including a pressure reducing valve and a control valve for controlling the pilot pressure of said pressure reducing valve; and detecting means for detecting the values of the predetermined factors of the body and supplying signals representing the values detected to said control valve so as to control the pilot pressure of said pressure reducing valve.

2. A control apparatus according to claim 1, wherein said control valve of said hydraulic control means is an electromagnetic control valve.

3. A control apparatus according to claim 1 or 2, wherein the body is a vehicle having a power steering assembly, said pressure reducing valve is connected to the power steering assembly, a fluid is supplied from the fluid source of the power steering assembly through the pressure reducing valve to the cylinder of said hydraulic cylinder means.

* * * * *